J. J. COLLIER.
MINE SHAFT GATE.
APPLICATION FILED JAN. 14, 1916.
1,211,412.
Patented Jan. 9, 1917.
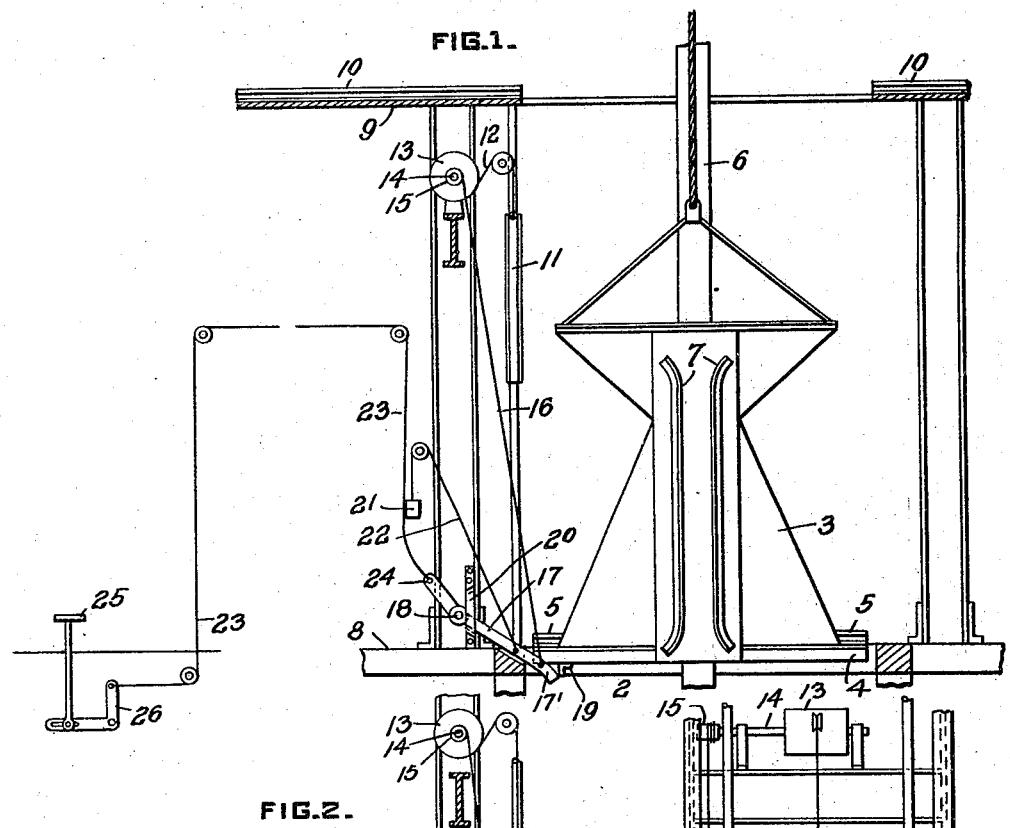
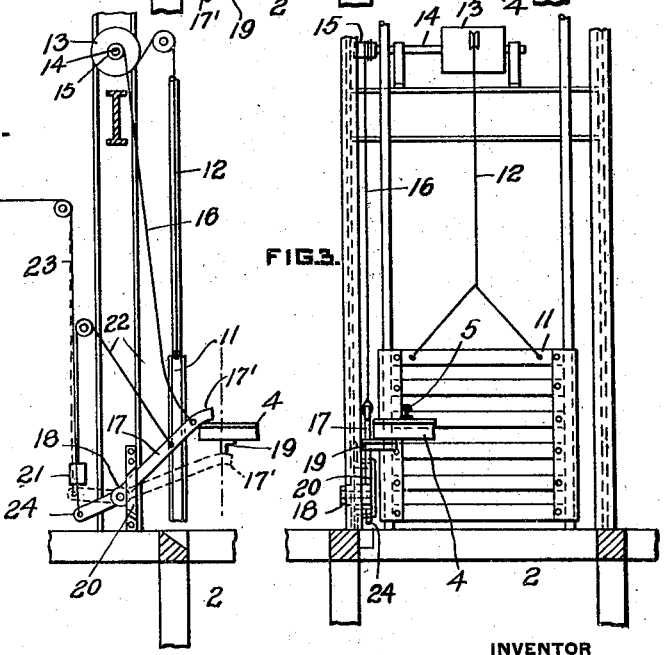
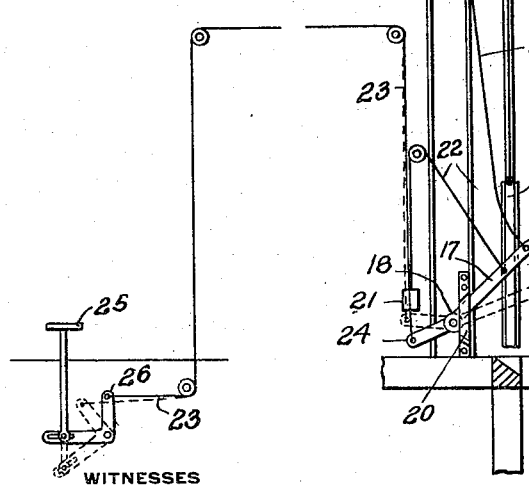
WITNESSES
J. Herbert Bradley.
Ella McConnell
INVENTOR
John J. Collier,
By Jas Herbert
Atty.

UNITED STATES PATENT OFFICE.

JOHN J. COLLIER, OF IRWIN, PENNSYLVANIA.

MINE-SHAFT GATE.

1,211,412.          Specification of Letters Patent.      Patented Jan. 9, 1917.

Application filed January 14, 1916. Serial No. 72,050.

*To all whom it may concern:*

Be it known that I, JOHN J. COLLIER, a citizen of the United States, and resident of Irwin, in the county of Westmoreland and State of Pennsylvania, have invented certain new and useful Improvements in Mine-Shaft Gates, of which the following is a specification.

The object of this invention is to provide simple and efficient gate mechanism for shaft landings, the same being designed especially for mine shafts and arranged to be operated by the mine cage only at such times as the landing is to be used, at all other times the cage moving past the closed gate without opening it. In conformity with safety requirements prescribed by State law or other authorities, the landing gates should be under the control of the engineer who operates the cage, so that the gate at a given landing is opened only when the landing is to be used. And it is desirable to utilize the cage for opening the gate, whereby the latter is opened only upon the approach of the cage and automatically closes when the cage moves away from the landing. The desirable features thus briefly outlined are embodied in the mechanism of the present invention, there being provision for causing the gate to be operated by the cage at such times only as are determined by the engineer, at all other times the gate opening mechanism being inoperative and the gate remaining closed.

In the accompanying drawings, Figure 1 is a view in elevation of the improved mechanism, the same showing the gate raised and open and the cage floor in register with the landing. Fig. 2 is an elevation of a portion of the mechanism illustrated in Fig. 1, the full-line position of the parts indicating their normal position as when out of the path of the cage, and the dotted lines indicating the mechanism when moved into position to be operated by the cage, in both positions the gate being shown closed. Fig. 3 is an elevation taken at right angles to Fig. 2 with the parts in the position indicated in said view.

Referring to the drawings, 2 designates a mine shaft and 3 is the cage or elevator shown largely in outline, 4 being the floor thereof which is ordinarily provided with track rails 5. At opposite sides of the shaft are the upright shaft guides 6 which are embraced by the cage guides 7, all being of usual and well-known construction. 8 is the landing at the top of the shaft and 9 is the elevated tipple landing, the latter provided with rails 10 with which rails 5 of the cage are adapted to register when the cage is raised for discharging or receiving pit cars. The ground-level landing 8 is ordinarily used by the miners when entering and leaving the mine, also for loading and unloading supplies that are handled by the elevator. The gate controlling this landing is normally closed and is or should be under the control of the engineer who operates the cage so that it will be opened by the cage only when the landing is to be used, remaining closed at all other times.

The mechanism of the present invention provides simple and highly efficient means for operating the gate under the conditions described. The landing gate 11 is slidable vertically, being suspended from cable 12 which is wound on spool 13 mounted on elevated shaft 14. This shaft carries a smaller spool 15 on which the operating cable 16 winds and unwinds oppositely to cable 12. The lower end of cable 16 is secured to lever arm 17 which is mounted at 18 to swing vertically at one side of the landing in such manner that when depressed its free extremity 17' is in the path of an arm 19 projecting from cage floor 4, as shown in dotted lines Fig. 2, while when elevated said arm extremity is out of the path of arm 19, as shown in full lines in the same figure. The movement of arm 17 is limited by the guide or keeper 20. A counterweight 21 is secured by line 22 to arm 17 holding the latter normally fully raised and with cable 16 slack, as in Fig. 2, the gate being in fully lowered and closed position. A setting cable 23 is secured to the rear extremity 24 of arm 17 and extends to the station of the hoisting engineer who controls the operation of the cage, a foot treadle 25 being secured thereto at said station by means of bell crank lever 26.

Operation: The normal position of the mechanism is that shown in full lines in Fig. 2, the cage being movable vertically to and from tipple landing 9 without affecting the gate. When, however, the latter is to be operated the engineer causes the cage to move slightly above landing 8. He then depresses treadle 25, thereby lowering the main portion of arm 17 against the pull of counterweight 21, taking up the slack in cable 16 and placing arm extremity 17' in the path of cage arm 19. The cage is then caused to lower to the level of landing 8 and in so doing depresses arm 17 to the position shown in Fig. 1 and the resulting extension of cable 16 results in winding cable 12 on its spool 13, thereby raising the gate and opening the entrance to the landing. As soon as the cage begins to lower from landing 8, arm 17 is released and immediately the weight of the gate causes it to lower and close, again restoring the parts to the inoperative position shown in full lines in Fig. 2, this movement being of course assisted by the action of counterweight 21.

The mechanism is of simple construction and certain in operation, and by means thereof the landing gate is under the full control of the engineer who operates the cage, and is open only at such times as the mechanism is set for opening by the engineer, at all other times the gate being closed and unaffected by the movements of the cage. Obviously, the improved mechanism may be applied to any landing of the shaft other than that at the ground level, although designed primarily for the latter.

I claim:

1. The combination of a normally closed gate for a shaft landing, a cage movable in the shaft, a vertically swinging arm adapted to extend into the path of the cage, a cable extending from the arm and operatively connected to the gate for opening the latter when the arm is depressed by the cage, a counterweight for raising the arm out of cage-engaging position when the gate is closed and thereby slacking said gate-actuating cable, and means for causing the arm to move into cage-engaging position without affecting the position of the gate said movement being afforded by the slack in said cable.

2. The combination of a normally closed gate for a shaft landing, a cage movable in the shaft, a vertically swinging arm adapted to move into the path of the cage, a cable operatively connecting said arm and the gate for opening the latter when the arm is depressed by the cage, a counterweight for moving the arm out of cage-engaging position when the gate is closed, a cable connected to the arm for lowering it into cage-engaging position notwithstanding the counterweight, and means for actuating said arm-lowering cable.

3. The combination of a vertically-movable cage, a vertically-movable normally closed gate, a winding shaft controlling the vertical position of the gate, a gate-operating cable between the shaft and gate through which said shaft controls the gate, a shaft-operating cable for rotating the shaft to wind up the gate cable and elevate the gate, a vertically-swingable arm for actuating said shaft-operating cable to elevate the gate and hold the same elevated, manually-operated means for moving said arm into the path of movement of the cage for depression thereby to cause winding up of said gate cable, and means constantly acting on said arm to return the same to and normally maintain the same out of the path of said cage.

4. The combination of a vertically-movable cage, a normally-closed gate for a landing stage in the shaft in which said cage is movable, means for opening said gate, a swingable arm for operating said means to open the gate and hold the same open, means constantly acting on said arm to yieldingly maintain the same at its limit of upward swing in normal inoperative position removed from the path of movement of the cage and for automatically returning the same to such position independently of the movement of said gate, and manually operated connections from a remote point for swinging said arm downwardly until it enters the path of movement of said cage, substantially as described.

5. The combination of a vertically-movable cage, a vertically-movable gravity-drop normally-closed gate, a winding shaft having operative connection with said gate for elevating the same, a vertically movable shaft-operating member having constant operative connection with said shaft for rotating the same to elevate the gate and hold the same elevated, means yieldingly maintaining said member in normal inoperative position and for automatically returning the same to such position independently of said gate, and manually operated means at a point remote from said gate and cage having operative cable connection with said member for moving the same into operative position in the path of the cage.

6. The combination of a vertically-movable cage, a normally-closed gate, a winding shaft having cable connection with said gate, a vertically movable arm, a shaft rotating pull cable from said arm to said shaft arranged to rotate the shaft to lift said gate when said arm is swung downwardly by the cage, said arm being normally maintained in inoperative position out of the path of the car, and manually controlled connections to said arm for depressing the same into the path of the car, substantially as described.

In testimony whereof I affix my signature in presence of two witnesses.

JOHN J. COLLIER

Witnesses:
W. F. GALLAGHER,
E. JESSIE COCHRAN.